United States Patent [19]

Marumoto et al.

[11] Patent Number: 5,064,920
[45] Date of Patent: Nov. 12, 1991

[54] FLUORINE-CONTAINING COPOLYMER AND COATING COMPOSITION CONTAINING THE COPOLYMER

[75] Inventors: Etsuzo Marumoto; Masanobu Koyama; Akihito Iida; Yukiya Sakamoto; Makoto Aoyama; Mamoru Takahashi, all of Nagoya, Japan

[73] Assignee: Toagosei Chemical Industry Co., Ltd., Tokyo, Japan

[21] Appl. No.: 611,596

[22] Filed: Nov. 13, 1990

[30] Foreign Application Priority Data

Nov. 17, 1989 [JP] Japan ................................. 1-298988
Sep. 25, 1990 [JP] Japan ................................. 2-254563

[51] Int. Cl.$^5$ .............................................. C08F 12/20
[52] U.S. Cl. .................................... 526/249; 526/254; 526/255
[58] Field of Search ..................... 526/254, 255, 249

[56] References Cited

U.S. PATENT DOCUMENTS

| | | | |
|---|---|---|---|
| 2,863,906 | 12/1958 | Balanauckos et al. | 526/249 |
| 3,307,090 | 2/1967 | Pintell | 526/242 |
| 3,639,438 | 2/1972 | Smeltz | 526/242 |
| 3,966,660 | 6/1976 | Tamura et al. | |
| 4,631,326 | 12/1986 | Koishi et al. | 526/249 |
| 4,990,582 | 2/1991 | Salamone | 526/242 |

FOREIGN PATENT DOCUMENTS

| | | | |
|---|---|---|---|
| 57-34107 | 2/1982 | Japan . | |
| 61-57609 | 3/1986 | Japan . | |
| 888014 | 1/1962 | United Kingdom . | |
| 1242362 | 8/1971 | United Kingdom | 526/249 |

Primary Examiner—Joseph L. Schofer
Assistant Examiner—N. Sarofin
Attorney, Agent, or Firm—Browdy and Neimark

[57] ABSTRACT

The present invention provides a fluorine-containing copolymer which comprises the following monomers as essential components:

(a) a fluoroolefin,
(b) a hydroxyalkyl crotonate, and
(c) a vinyl monomer other than the above monomers (a) and (b). The present invention further provides a coating composition comprising the above fluorine-containing copolymer and a crosslinking agent having a functional group which reacts with hydroxyl group.

17 Claims, 2 Drawing Sheets

FLUORINE-CONTAINING COPOLYMER AND COATING COMPOSITION CONTAINING THE COPOLYMER

The present invention relates to a fluorine-containing copolymer soluble in organic solvents and having hydroxyl group, and further relates to a coating composition of high weathering resistance which contains said copolymer as a main component.

Research of fluorine-containing copolymers as resins for a coating composition has recently been conducted intensively because of their excellent chemical resistance and weathering resistance. Especially, attention has been paid to coating compositions containing solvent-soluble type resins such as fluorine-containing copolymers obtained by copolymerizing chlorotrifluoroethylene, cyclohexylvinyl ether, alkylvinyl ether and hydroxyalkylvinyl ether (Japanese Patent Laid-Open No. 57-34107) and fluorine-containing copolymers obtained by copolymerizing chlorotrifluoroethylene, fatty acid vinyl ester and hydroxyl group-containing allyl ether (Japanese Patent Laid-Open No. 61-57609).

These fluorine-containing copolymers disclosed in the above patent publications all have hydroxyl group in their molecules and cure at room temperature owing to the presence of the hydroxyl group upon reacting with polyisocyanate compounds. In addition, they contain chlorotrifluoroethylene unit at a high concentration of about 50 mol %, and so are apt to be inferior in dispersibility of pigment, solubility in solvents and adhesion to a substrate, although they are superior in chemical resistance and weathering resistance. Therefore, further improvement has been desired.

In an attempt to obtain a flourine-containing resin which is soluble in solvents and superior in pigment dispersibility and adhesion to a substrate, the inventors have thought of using hydroxyl group-containing ester monomers in place of ether monomers such as hydroxyl group-containing vinyl ethers and allyl ethers which have been used for introduction of hydroxyl group into fluorine-containing copolymers. Various hydroxyl group-containing ester monomers including 2-hydroxyethyl acrylate and methacrylate, which are representative hydroxyl group-containing ester monomers, have been studied on their copolymerizability with fluoroolefins, especially chlorotrifluoroethylene. As a result, it has been found that hydroxyalkyl crotonates can be copolymerized with fluoroolefins, especially chlorotrifluoroethylene at such a high efficiency as unexpectable from conventionally known copolymerizability and furthermore that the copolymerization proceeds more efficiently in the presence of a carboxylic acid vinyl ester. Thus, the present invention has been accomplished.

That is, the present invention relates to a fluorine-containing copolymer which comprises the following monomers as essential components:
(a) a fluoroolefin,
(b) a hydroxyalkyl crotonate and
(c) a vinyl monomer other than the above monomers.

The present invention further relates to a coating composition comprising the above fluorine-containing copolymer and a crosslinking agent having a functional group which reacts with hydroxyl group.

Figure 1:
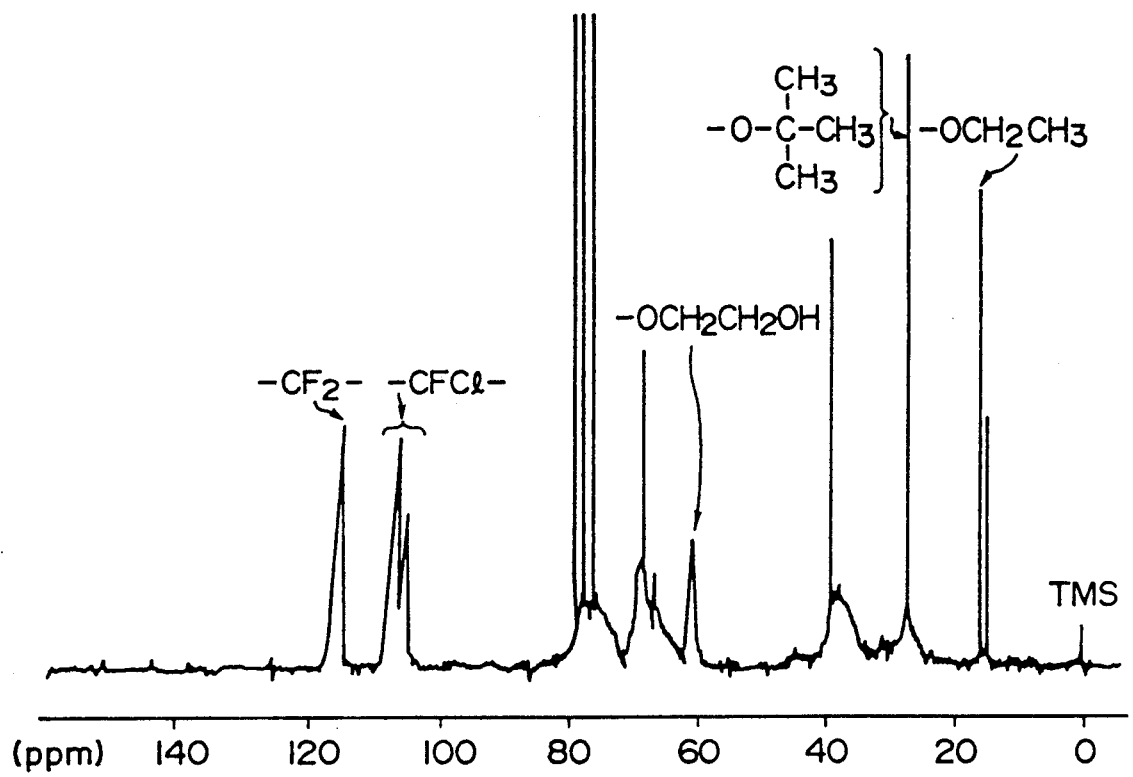
FIG. 1 shows $^{13}$C-NMR spectrum of chlorotrifluoroethylene/vinyl pivalate/ethylvinyl ether/2-hydroxyethyl crotonate quadripolymer obtained in Example 1.

The present invention will be explained in more detail.

The fluorine-containing copolymer of the present invention is obtained by copolymerizing a fluoroolefin, a hydroxyalkyl crotonate, and a vinyl monomer other than the above two monomers.

In the present invention, two or more monomers may be used for each of the above monomers. Therefore, the fluorine-containing copolymer of the present invention includes not only terpolymer, but also multicopolymers such as quadripolymer, quinquepolymer and copolymers comprising more comonomers.

Fluoroolefins used in the present invention include, for example, monofluoroethylene, difluoroethylene, trifluoroethylene, chlorotrifluoroethylene, tetrafluoroethylene, and hexafluoropropylene. Among them, chlorotrifluoroethylene and tetrafluoroethylene are preferred, and chlorotrifluoroethylene is especially preferred.

Hydroxyalkyl crotonates include, for example, 2-hydroxyethyl crotonate, 2-hydroxypropyl crotonate, 3-hydroxypropyl crotonate, 3-hydroxybutyl crotonate, 4-hydroxybutyl crotonate, 5-hydroxypentyl crotonate and 6-hydroxyhexyl crotonate.

Vinyl monomers other than the above monomers include, for example, olefins such as ethylene and propylene; chlorinated olefins such as vinyl chloride and vinylidene chloride; alkylvinyl ethers such as ethylvinyl ether and butylvinyl ether; allyl group-containing compounds such as allyl alcohol and allylglycidyl ether; and crotonate esters such as methyl crotonate, ethyl crotonate and benzyl crotonate. Preferred are cycloalkylvinyl ethers, alkylvinyl ethers and carboxylic acid vinyl esters, more preferred are carboxylic acid vinyl esters, and especially preferred are combinations of carboxylic acid vinyl esters and crotonic acid.

As examples of carboxylic acid vinyl esters, there are cited aliphatic carboxylic acid vinyl esters such as vinyl acetate, vinyl propionate, vinyl butyrate, vinyl pivalate, vinyl caproate, vinyl caprylate, vinyl caprate, vinyl laurate and vinyl stearate; alicyclic carboxylic acid vinyl esters such as vinyl cyclohexanecarboxylate; and aromatic carboxylic acid vinyl esters such as vinyl beznoate, vinyl cinnamate and vinyl p -tert-butylbenzoate. Vinyl pivalate and vinyl acetate are preferred, and vinyl pivalate is especially preferred.

Amounts of respective monomers constituting the copolymer of the present invention are 30–60 mol %, preferably 40–60 mol % of fluoroolefin, 3–30 mol % of hydroxyalkyl crotonate and 10–67 mol %, preferably 10–57 mol % of vinyl monomer other than the above monomers.

When a carboxylic acid vinyl ester which is preferred in the present invention, is selected as the vinyl monomer other than monomers (a) and (b), amount of the carboxylic acid vinyl ester is preferably 10–50 mol % and especially preferably, this is used in combination with 1–5 mol % of crotonic acid.

If the amount of fluoroolefin is less than 30 mol %, the desired chemical resistance and weathering resistance cannot be obtained, and if it is more than 60 mol %, solubility of the copolymer in organic solvents decreases.

Hydroxyalkyl crotonate is a monomer unit necessary for introducing hydroxyl group into the copolymer, and if the amount thereof is less than 3 mol %, curing of the coated film is insufficient and the coated film is inferior in adhesion to a substrate. If it is more than 30 mol %, polymerization yield is inferior in view of limited copolymerizability of chlorotrifluoroethylene and hydroxyalkyl crotonate, and this is not economical.

The vinyl monomers other than monomers (a) and (b) are selected depending on characteristics required for the copolymer, and the amount thereof is also determined depending thereon. It is most preferred to select a carboxylic acid vinyl ester and crotonic acid in combination as this monomer as mentioned above.

Carboxylic acid vinyl ester plays an important part in copolymerizing hydroxyalkyl crotonate with fluoroolefin, especially chlorotrifluoroethylene. That is, when carboxylic acid vinyl ester exists in the polymerization system, hydroxyalkyl crotonate is efficiently introduced into fluorine-containing copolymer and besides, it also contributes to improvement of copolymerization yield of hydroxyalkyl crotonate. Moreover, physical properties, chemical resistance and weathering resistance of the copolymer can be improved by using the carboxylic acid vinyl ester in an amount as referred to above.

Crotonic acid does a function to impart dispersibility of pigment, especially organic pigment for a coating composition, to the fluorine-containing copolymer, and amount of crotonic acid is preferably 1-5 mol %.

Hitherto, there has been known no unsaturated carboxylic acid which is inexpensive and can be efficiently copolymerized with fluoroolefins, especially chlorotrifluoroethylene and hence, general process for introducing carboxyl group into a fluorine-containing copolymer has been to react hydroxyl group previously introduced into the copolymer with succinic anhydride or the like. However, by using carboxylic acid vinyl ester, crotonic acid can be copolymerized with fluoroolefins, especially chlorotrifluoroethylene, and carboxyl group can be very easily introduced into a fluorine-containing copolymer.

Copolymerization of the above monomers will be explained.

For copolymerization of the above monomers it is preferred to copolymerize them by solution polymerization, suspension polymerization, emulsion polymerization, bulk polymerization or the like at a polymerization temperature of about 30–80° C. and under a pressure of 1–100 kg/cm$^2$, preferably 3–10 kg/cm$^2$ in the presence of a free-radical-generating polymerization initiator shown below.

As the free-radical-generating polymerization initiator, there may be used peroxides such as diisopropyl peroxydicarbonate, tert-butylperoxy pivalate, benzoyl peroxide and lauroyl peroxide; oil-soluble polymerization initiators such as azo compounds, e.g., azobisisobutyronitrile and azobisisovaleronitrile; water-soluble initiators such as ammonium persulfate and potassium persulfate; and redox initiators.

In the case of employing solution polymerization, organic hydrocarbon compounds and fluorine-containing organic solvents are suitable as solvents for polymerization. As a suspension agent used when suspension polymerization is employed, partially saponified polyvinyl alcohol and methyl cellulose are suitable.

The fluorine-containing copolymers of the present invention obtained by the above-mentioned copolymerization have an intrinsic viscosity of preferably 0.1–2.0 dl/g, more preferably 0.2–0.8 dl/g measured as tetrahydrofuran solution at 30° C. If the intrinsic viscosity of the copolymer is less than 0.1 dl/g, mechanical properties of the coated film are inferior when the copolymer is used for a coating composition, and if it is more than 2.0 dl/g, solubility in solvents decreases.

As solvents which dissolve the fluorine-containing copolymer, there are cited, for example, cyclic ethers such as tetrahydrofuran and dioxane; aromatic hydrocarbon compounds such as benzene, toluene and xylene; esters such as ethyl acetate and butyl acetate; ketones such as acetone, methyl ethyl ketone, methylisobutyl ketone and cyclohexanone; nitrogen-containing compounds such as dimethylformamide, dimethyl acetamide and pyridine; and halogen-containing compounds such as 1,1,1-trichloroethane and trichloroethylene.

When the fluorine-containing copolymer is used for a varnish, it may be used by adjusting the solid concentration to about 50–60% by weight with the above-mentioned solvents.

The fluorine-containing copolymer of the present invention has hydroxyl group in the molecule and therefore, can provide an excellent coating composition when combined with a crosslinking agent which reacts with hydroxyl group.

For example, the fluorine-containing copolymer in combination with a polyisocyanate compound can be used as a cold curing type coating composition. This cold curing type coating composition can be prepared by the conventional method. For example, it can be prepared by adding a polyisocyanate compound such as COLONATE EH or COLONATE 2507 manufactured by Nippon Polyurethane Industry Co., Ltd. to a solution in which the fluorine-containing copolymer is dissolved.

When the resulting coating composition is coated on a substrate and the solvent is dried at room temperature, curing reaction proceeds in the coated film to give a cured coating film.

Furthermore, a heat curing type coating composition can be prepared from the fluorine-containing polymer in combination with, e.g., melamine, urea resin, or polybasic acid or the anhydride thereof.

In preparation of a coating composition, various additives such as pigment, fluidity adjusting agent, ultraviolet absorber, dispersion stabilizer, and antioxidant and, if necessary, other resins may also be added to a solution of the fluorine-containing copolymer.

In the present invention, a hydroxyl group-containing ester monomer is used as a monomer to be copolymerized with chlorotrifluoroethylene. Therefore, the resulting fluorine-containing copolymer is excellent in pigment dispersibility and extremely excellent in adhesion to metallic substrates such as iron and aluminum and besies, show high solubility in organic solvents.

A cold curing coating composition containing the copolymer can be suitably coated on concrete and wood in addition to the above-mentioned metals.

Furthermore, according to the present invention, carboxyl group can be very easily introduced into the fluorine-containing copolymer, and therefore resins for a coating composition excellent in dispersibility of pigments, especially organic pigments can be easily obtained.

The present invention will be explained in more detail in the following examples.

EXAMPLE 1

In a 1 liter autoclave equipped with a stirrer there were charged 600 g of deionized water, 0.5 g of METHOLOSE 60SH50 (hdyroxypropylemthyl cellulose manufactured by Shin-Etsu Chemical Co., Ltd.), 3.5 g of potassium carbonate and 3.5 g of tert-butylperoxy pivalate (hereinafter referred to as "t-BPPV") and thereafter, further charged 100 g of vinyl pivalate (hereianfter referred to as "VPV"), 18.7 g of ethylvinyl ether (hereinafter referred to as "EVE") and 33.8 g of 2-hydroxyethyl crotonate (hereinafter referred to as "2-HECR").

After atmosphere in the autoclave was replaced with nitrogen and vacuum extracted, 151.4 g of chlorotrifluoroethylene (hereinafter referred to as "CTFE") was introduced into the autoclave and temperature of the content was gradually elevated. After polymerization was carried out for 8 hours at 60° C., unreacted CTFE was removed and the autoclave was opened to obtain a copolymer suspension. The suspension was filtrated, washed with water and dried to obtain 258 g of a copolymer (polymerization yield 85%).

Intrinsic viscosity of the resulting copolymer measured in tetrahydrofuran at 30° C. was 0.39 dl/g, heat decomposition temperature thereof according to DSC-TG was 258° C., and glass transition temperature (Tg) thereof was 57° C. $^{13}$C-NMR spectrum of this copolymer was as shown in the accompanying FIG. 1, and weight percentages of elements of the copolymer obtained by elemental analysis were as follows: C: 51.9%, H: 3.3%, Cl: 15.2%, F: 24.5%.

Fluorine content measured by colorimetry according to the Alizarin Complexon method was 24.5%. Ratio (mol %) of monomer units of the resulting copolymer which was obtained from the above experimental data was CTFE/VPV/EVE/2-HECR=50.1/31.2/9.4/9.1.

To a solution prepared by dissolving 50 g of the copolymer in 50 g of xylene there were added 25 g of xylene, 75 g of methylisobutyl ketone and 25 g of titanium oxide or 3 g of carbon black, followed by mixing in a paint conditioner for 1 hour. To the resulting solution there were added 0.26 mg of dibutyltin dilaurate and 7 g of COLONATE EH (manufactured by Nippon Polyurethane Industry Co., Ltd.) [NCO/OH=1/1 (equivalent ratio)], and the resulting solution was coated on a chromate-treated aluminum sheet of 0.6 mm thickness and air-dried for one week at room temperature to obtain a coating film of 20 μm thickness.

Evaluation of the coating film was carried out by JIS-K5400 and various usual methods to obtain the results as shown in Table 3. Measurement of gloss which indicates pigment dispersibility, was carried out for both the sample containing titanium oxide and the sample containing carbon black, respectively. Evaluation of properties other than the pigment dispersibility was conducted on the sample containing titanium oxide.

EXAMPLES 2-3

Polymerization was carried out in the same manner as in Example 1 except that compositions of monomers, catalysts, polymerization solvents and other conditions as shown in Table 1, were used to obtain polymers having properties as shown in Table 1. Evaluation of coating films of these polymers was also conducted as in Example 1 to obtain the results as shown in Table 3.

EXAMPLE 4

In a 1 liter autoclave equipped with a stirrer there were charged 460 g of tert-butanol (hereinafter referred to as "t-BuOH"), 3.9 g of potassium carbonate and 3.5 g of t-BPPV and thereafter, further charged 98.3 g of cyclohexylvinyl ether (hereinafter referred to as "CHVE"), 18.7 g of EVE and 33.8 g of 2-HECR.

After atmosphere in the autoclave was replaced with nitrogen and vacuum extracted, 151.4 g of CTFE was introduced into the autoclave and temperature of the content was gradually elevated. After polymerization was carried out for 8 hours at 60° C., unreacted CTFE was removed and the autoclave was opened to obtain a copolymer solution. The solution was filtrated and then the copolymer was precipitated with methanol in an amount of 10 times the amount of the filtrate and dried for 24 hours by a vacuum dryer at 60° C. to obtain 256 g of the copolymer. Further, 50 g of the resulting copolymer was dissolved in 50 cc of acetone and purified by reprecipitation with methanol and dried. Properties of the copolymer was measured in the same manner as in Example 1.

Figure 2:
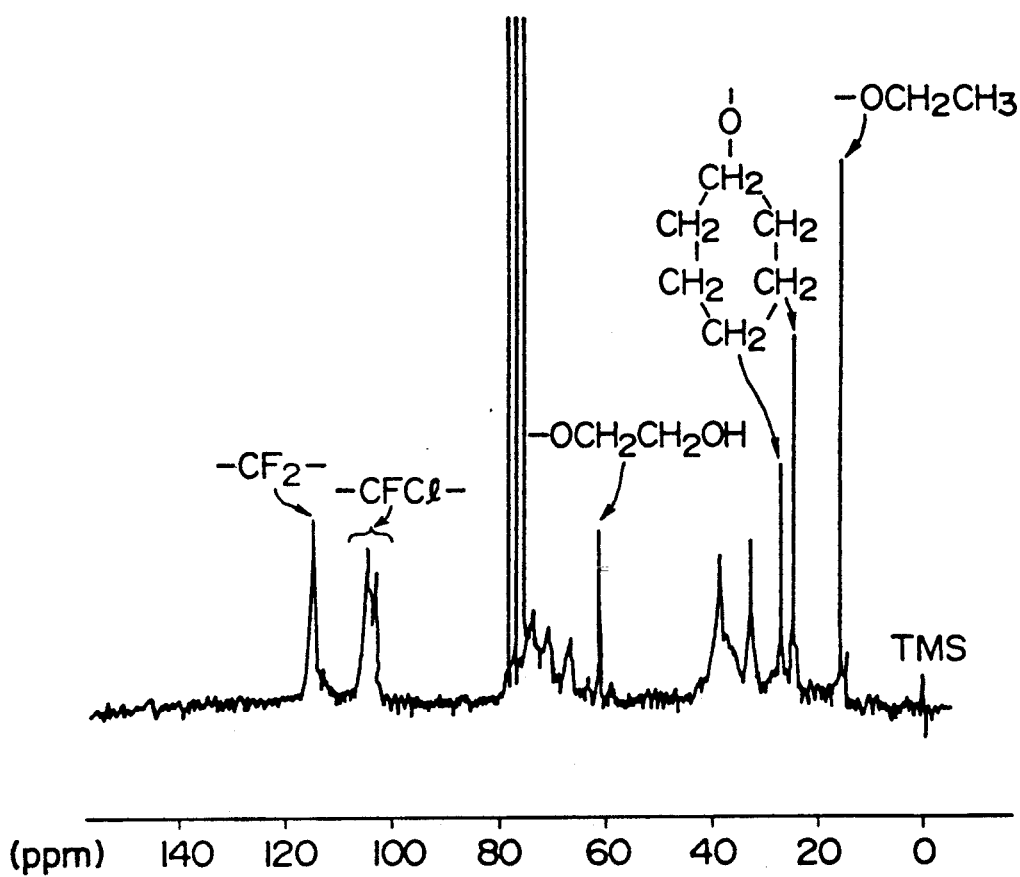
FIG. 2 shows $^{13}$C-NMR spectrum of chlorotrifluoroethylene/ethylvinyl ether/cyclohexylvinyl ether/ 2-hydroxyethyl crotonate quadripolymer obtained in Example 4.

Intrinsic viscosity of the copolymer was 0.25 dl/g, heat decomposition temperature thereof was 258° C., and glass transition temperature (Tg) thereof was 34° C. $^3$C-NMR spectrum of this copolymer was as shown in FIG. 2, and weight percentages of elements of the copolymer obtained by elemental analysis were C: 51.9%, H: 3.3% and Cl: 15.2%, and fluorine content was 24.6%.

Ratio (mol %) of monomer units of the resulting copolymer which was obtained from the above experimental data, was CTFE/CHVE/EVE/2-HECR=50.1/30.4/10.4/9.1.

Measurement of properties as a coating composition was carried out as in Example 1, and the results are shown in Table 3.

EXAMPLES 5-13 AND COMPARATIVE EXAMPLES 1-8

Polymerization was carried out in the same manner as in Example 4 except that compositions of monomers, catalysts, polymerization solvents and other conditions as shown in Table 1 and Table 2 were employed, to obtain polymers having properties as shown in Table 1 and Table 2. Evaluation of coating films formed using these polymers was conducted as in Example 1 to obtain the results as shown in Table 3.

It can be seen from these Examples and Comparative Examples, especially Comparative Examples 3, 4, 7 and 8 that hydroxyl group-containing unsaturated carboxylic acid alkyl esters other than monomer (b) make substantially no contribution to polymerization and only a crotonic acid hydroxyalkyl ester of monomer (b) shows peculiar contribution to polymerization.

TABLE 1

|  |  | Example 1 | Example 2 | Example 3 | Example 4 | Example 5 | Example 6 | Example 7 |
|---|---|---|---|---|---|---|---|---|
| CTFE | g | 151.4 (50) | 151.4 (50) | 151.4 (50) | 151.4 (50) | 151.4 (50) | 151.4 (50) | 151.4 (50) |
| TFE | (Value in | — | — | — | — | — | — | — |
| 2-HECR | parentheses | 33.8 (10) | 33.8 (10) | 33.8 (10) | 33.8 (10) | 50.8 (15) | 50.8 (15) | 33.8 (10) |
| VPV | indicates | 100.0 (30) | — | 66.6 (20) | — | — | 100.0 (30) | 83.3 (25) |
| VAc | mol %) | — | 44.8 (20) | 33.6 (15) | — | 78.3 (35) | — | — |

TABLE 1-continued

|  | | | | | | | |
|---|---|---|---|---|---|---|---|
| CRA |  |  |  |  |  |  | 11.2 (5) |
| HEA |  |  |  |  |  |  |  |
| HEMA | — | — | — |  |  |  | — |
| EGMAE |  |  | — |  |  |  |  |
| HBVE |  |  |  |  |  | — | — |
| EVE | 18.7 (10) | 18.7 (10) |  | 18.7 (10) | — | 9.4 (5) | 18.7 (10) |
| BVE |  |  |  | — | — |  | — |
| CHVE |  |  |  | 98.3 (30) |  |  |  |
| ECR |  | 29.6 (10) | 14.8 (5) | — |  |  | — |
| BZCR |  |  |  |  |  |  |  |
| ABz |  | — | — | — |  |  | — |
| Initiator (g) | t-BPPV 3.5 | t-BPPV 2.3 HP355 3.3 | t-BPPV 3.5 | t-BPPV 3.5 | NPP 2.0 | t-BPPV 3.5 | t-BPPV 3.5 |
| Polymerization medium (g) | water 600 | water 600 | water 500 IPA 78 | t-BuOH 460 | Xylene 520 | t-BuOH 460 | EtAc 540 |
| Polymerization temperature (°C.) | 60 | 60 | 60 | 60 | 40 | 60 | 60 |
| Polymerization time (hr) | 8 | 9 | 8 | 8 | 10 | 8 | 8 |
| Polymerization yield (%) | 85 | 85 | 79 | 85 | 82 | 80 | 81 |
| Fluorine content (wt %) | 24.5 | 25.0 | 24.9 | 24.6 | 25.5 | 23.5 | 23.5 |
| OH value (mg KOH/g) | 41 | 40 | 40 | 41 | 61 | 63 | 43 |
| Acid value (mg KOH/g) | 0 | 0 | 0 | 0 | 0 | 0 | 16 |
| Intrinsic viscosity (dl/g) | 0.39 | 0.44 | 0.35 | 0.25 | 0.28 | 0.31 | 0.37 |
| Tg (°C.) | 57 | 48 | 47 | 34 | 59 | 51 | 49 |

|  |  | Example 8 | Example 9 | Example 10 | Example 11 | Example 12 | Example 13 |
|---|---|---|---|---|---|---|---|
| CTFE | g | 151.4 (50) |  | 151.4 (50) | 166.5 (55) | 181.7 (60) | 121.1 (40) |
| TFE | (Value in | — | 130.0 (50) |  |  |  |  |
| 2-HECR | parentheses | 50.8 (15) | 33.8 (10) | 50.8 (15) | 33.8 (10) | 33.8 (10) | 67.8 (20) |
| VPV | indicates |  |  | — | — |  | 100.0 (30) |
| VAc | mol %) |  | — |  |  | 44.8 (20) |  |
| CRA |  |  |  |  |  |  |  |
| HEA |  |  |  |  |  |  |  |
| HEMA |  | — | — |  |  |  |  |
| EGMAE |  | — | — |  |  |  |  |
| HBVE |  |  |  |  |  |  |  |
| EVE |  |  | 18.7 (10) | 28.1 (15) | 37.4 (20) | 18.7 (10) | 18.7 (10) |
| BVE |  | 13.0 (5) | — | — | — |  |  |
| CHVE |  | 98.3 (30) | 98.3 (30) |  |  |  |  |
| ECR |  | — | — |  |  |  |  |
| BZCR |  |  |  |  | 68.6 (15) |  |  |
| ABz |  | — | — | 84.2 (20) |  |  |  |
| Initiator (g) |  | t-BPPV 3.5 | t-BPPV 3.5 | t-BPPV 3.5 | t-BPPV 3.5 | NPP 2.0 | t-BPPV 3.5 |
| Polymerization medium (g) |  | t-BuOH 460 | t-BuOH 460 | t-BuOH 460 | t-BuOH 460 | Xylene 520 | t-BuOH 460 |
| Polymerization temperature (°C.) |  | 60 | 60 | 60 | 60 | 40 | 60 |
| Polymerization time (hr) |  | 8 | 8 | 8 | 8 | 10 | 8 |
| Polymerization yield (%) |  | 84 | 85 | 78 | 79 | 83 | 88 |
| Fluorine content (wt %) |  | 24.7 | 36.5 | 23.1 | 24.5 | 28.9 | 19.6 |
| OH value (mg KOH/g) |  | 60 | 42 | 58 | 40 | 40 | 73 |
| Acid value (mg KOH/g) |  | 0 | 0 | 0 | 0 | 0 | 0 |
| Intrinsic viscosity (dl/g) |  | 0.30 | 0.32 | 0.33 | 0.35 | 0.49 | 0.30 |
| Tg (°C.) |  | 37 | 38 | 35 | 47 | 51 | 52 |

Note:
TFE: Tetrafluoroethylene;
CRA: Crotonic acid;
HEMA: 2-Hydroxyethyl methacrylate;
HBVE: Hydroxybutylvinyl ether;
ECR: Ethyl crotonate;
NPP: n-Propylperoxy dicarbonate;
EtAc: Ethyl acetate; and IPA: Isopropyl alcohol.
VAc: Vinyl acetate;
HEA: 2-Hydroxyethyl acrylate;
EGMAE: Ethylene glycol monoallyl ether;
BVE: Butylvinyl ether;
BZCR: Benzyl crotonate; and ABz: Allyl benzoate.
HP 355: 3,5,5-Trimethylhexanoyl peroxide

TABLE 2

| | | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| CTFE | g | 151.4 (50) | 151.4 (50) | 151.4 (50) | 151.4 (50) | 151.4 (50) | 151.4 (50) | 151.4 (50) | 151.4 (50) |
| TFE | (Value in | | | — | — | | | | |
| 2-HECR | paren- | | | | | | | | |
| VPV | theses | 116.6 (35) | 100.0 (30) | | | | | — | — |
| VAc | indicates | — | | 78.3 (35) | 78.3 (35) | | | — | |
| CRA | mol %) | | | | | | | | |
| HEA | | | | 45.3 (15) | | | | 45.3 (15) | |
| HEMA | | | — | — | 50.8 (15) | | — | | 50.8 (15) |
| EGMAE | | | 39.8 (15) | — | — | | 39.8 (15) | | |
| HBVE | | | — | | | 30.2 (10) | | | |
| EVE | | 28.1 (15) | 9.4 (5) | | | 18.7 (10) | 9.4 (5) | | 37.4 (20) |
| BVE | | | | | — | | | 13.0 (5) | 13.0 (5) |
| CHVE | | | | | | 98.3 (30) | 98.3 (30) | 98.3 (30) | 98.3 (30) |
| ECR | | | | | — | | | | |
| BZCR | | | | | | | | | |
| ABz | | | — | — | — | — | | | |
| Initiator (g) | | NPP 2.0 | t-BPPV 3.5 | NPP 2.0 | NPP 2.0 | t-BPPV 3.5 | t-BPPV 3.5 | t-BPPV 3.5 | t-BPPV 3.5 |
| Polymerization medium (g) | | EtAc 540 | t-BuOH 470 | Xylene 520 | Xylene 520 | t-BuOH 460 | t-BuOH 460 | t-BuOH 460 | t-BuOH 460 |
| Polymerization temperature (°C) | | 40 | 60 | 40 | 40 | 60 | 60 | 60 | 60 |
| Polymerization time (hr) | | 8 | 8 | 10 | 10 | 8 | 8 | 8 | 8 |
| Polymerization yield (%) | | 89 | 79 | 65 | 66 | 82 | 85 | 78 | 79 |
| Presence of precipitate | | no | no | yes | yes | no | no | no | no |
| Fluorine content (wt %) | | 25.9 | 24.5 | 27.8 | 27.6 | 25.9 | 24.3 | 24.6 | 24.5 |
| OH value (mg KOH/g) | | 0 | 60 | 3 | 1 | 42 | 51 | 3 | 1 |
| Acid value (mg KOH/g) | | 0 | 0 | 0 | 0 | 0 | 0 | 0 | 0 |
| Intrinsic viscosity (dl/g) | | 0.33 | 0.30 | 0.47 | 0.46 | 0.33 | 0.31 | 0.36 | 0.35 |
| Tg (°C) | | 52 | 49 | 58 | 57 | 33 | 49 | 34 | 34 |

TABLE 3

| | Pigment dispersibility Gloss (60° Gross) | | Hardness Pencil hardness | Flexing resistance | Impact resistance Du Pont impact test 1 kg, ½ inch | Adhesion to substrate Crosshatch adhesion (retention rate) | | Stain resistance*[1] "Magic ink" ® test | Solvent resistance |
|---|---|---|---|---|---|---|---|---|---|
| | Titanium oxide | Carbon black | Surface scratch | T-flexing test | | Initial value | After dipping in boiling water for 1 hour | Red/Black | Number of rubbings with xylene |
| Example 1 | 84 | 88 | 2H | 1T | 50 cm | 100/100 | 100/100 | ⊚/⊚ | More than 200 |
| Example 2 | 83 | 87 | 2H | 1T | 50 cm | 100/100 | 100/100- | ⊚/⊚ | More than 200 |
| Example 3 | 83 | 86 | 2H | 1T | 50 cm | 100/100 | 100/100- | ⊚/⊚ | More than 200 |
| Example 4 | 84 | 88 | 2H | 1T | 50 cm | 100/100 | 100/100- | ○/⊚ | More than 200 |
| Example 5 | 86 | 89 | 2H | 1T | 50 cm | 100/100 | 100/100- | ⊚/⊚ | More than 200 |
| Example 6 | 85 | 88 | 2H | 1T | 50 cm | 100/100 | 100/100- | ⊚/⊚ | More than 200 |
| Example 7 | 87 | 95 | 2H | 1T | 50 cm | 100/100 | 100/100- | ⊚/⊚ | More than 200 |
| Example 8 | 87 | 91 | 2H | 1T | 50 cm | 100/100 | 100/100- | ○/⊚ | More than 200 |
| Example 9 | 83 | 87 | 2H | 1T | 50 cm | 100/100 | 100/100- | ○/⊚ | More than 200 |
| Example 10 | 86 | 90 | 2H | 1T | 50 cm | 100/100 | 100/100- | ○/⊚ | More than 200 |
| Example 11 | 83 | 86 | 2H | 1T | 50 cm | 100/100 | 100/100- | ○/⊚ | More than 200 |
| Example 12 | 83 | 86 | 2H | 1T | 50 cm | 100/100 | 100/100- | ○/○ | More than 200 |
| Example 13 | 87 | 90 | 2H | 1T | 50 cm | 100/100 | 100/100 | ○/⊚ | More than 200 |
| Comparative Example 1 | 10 | 5 | 2B | 5T | 10 cm | 0/100 | 0/100 | X/X | Less than 5 |
| Comparative Example 2 | 78 | 58 | H | 2T | 40 cm | 100/100 | 50/100 | △/○ | More than 200 |
| Comparative Example 3 | 21 | 7 | B | 5T | 10 cm | 0/100 | 0/100 | X/X | Less than 5 |
| Comparative Example 4 | 19 | 5 | 2B | 5T | 10 cm | 0/100 | 0/100 | X/X | Less than 5 |
| Comparative Example 5 | 82 | 57 | H | 1T | 50 cm | 100/100 | 70/100 | △/○ | More than 200 |
| Comparative Example 6 | 78 | 56 | H | 2T | 40 cm | 100/100 | 50/100 | △/○ | More than 200 |
| Comparative Example 7 | 21 | 7 | B | 5T | 10 cm | 0/100 | 0/100 | X/X | Less than 5 |
| Comparative Example 8 | 19 | 8 | 2B | 5T | 10 cm | 0/100 | 0/100 | X/X | Less than 5 |

TABLE 3-continued

| | Pigment dispersibility Gloss (60° Gross) | | Hardness Pencil hardness | Flexing resistance | Impact resistance Du Pont impact test | Adhesion to substrate Crosshatch adhesion (retention rate) | | Stain resistance[1] "Magic ink" ® test | Solvent resistance |
|---|---|---|---|---|---|---|---|---|---|
| | Titanium oxide | Carbon black | Surface scratch | T-flexing test | 1 kg, ½ inch | Initial value | After dipping in boiling water for 1 hour | Red/Black | Number of rubbings with xylene |
| Example 8 | | | | | | | | | |

Note:
[1]Method of "Magic ink" ® (marking ink) test and criteria for evaluation:
Method: "Magic ink" ® of a given color is applied to a coating film and after this is left for 24 hours at 25° C., the ink is wiped off with ethanol.
Evaluation: "⊚": No stain of the ink is left. "○": Slight stain is left. "Δ": Considerable stain is left. "X": Stain is completely left.

What is claimed is:

1. A fluorine-containing copolymer which comprises the following monomers as essential components:
   (a) a fluoroolefin,
   (b) a hydroxyalkyl crotonate, and
   (c) a vinyl monomer other than the above monomers (a) and (b).

2. A fluorine-containing copolymer according to claim 1, wherein proportions of the monomers (a), (b) and (c) constituting the copolymer are as follows:
   (a) 30–60 mol %,
   (b) 3–30 mol %, and
   (c) 10–67 mol %.

3. A fluorine-containing copolymer according to claim 1, wherein proportions of the monomers (a), (b) and (c) constituting the copolymer are as follows:
   (a) 40–60 mol %,
   (b) 3–30 mol %, and
   (c) 10–57 mol %.

4. A fluorine-containing copolymer according to claim 1, which has an intrinsic viscosity of 0.1–2.0 dl/g measured as tetrahydrofuran solution at 30° C.

5. A fluorine-containing copolymer according to claim 1, which has an intrinsic viscosity of 0.2–0.8 dl/g measured as tetrahydrofuran solution at 30° C.

6. A fluorine-containing copolymer according to claim 1, wherein the fluoroolefin which is a monomer constituting the copolymer, is chlorotrifluoroethylene or tetrafluoroethylene.

7. A fluorine-containing copolymer according to claim 1, wherein the fluoroolefin which is a monomer constituting the copolymer, is chlorotrifluoroethylene.

8. A fluorine-containing copolymer according to claim 1, wherein the hydroxyalkyl crotonate which is a monomer constituting the copolymer, is 2-hydroxyethyl crotonate.

9. A fluorine-containing copolymer according to claim 1, wherein the vinyl monomer other than monomers (a) and (b) which is a monomer constituting the copolymer, is cycloalkylvinyl ether, alkylvinyl ether or carboxylic acid vinyl ester.

10. A fluorine-containing copolymer according to claim 9, wherein proportion of the cycloalkylvinyl ether, alkylvinyl ether or carboxylic acid vinyl ester constituting the copolymer is 10–50 mol %.

11. A fluorine-containing copolymer according to claim 9, wherein the carboxylic acid vinyl ester is vinyl pivalate or vinyl acetate.

12. A fluorine-containing copolymer according to claim 9, wherein the cycloalkylvinyl ether is cyclohexylvinyl ether.

13. A fluorine-containing copolymer according to claim 9, wherein the alkylvinyl ether is ethylvinyl ether or butylvinyl ether.

14. A fluorine-containing copolymer according to claim 1, wherein the vinyl monomer other than monomers (a) and (b) which is a monomer constituting the copolymer, comprises carboxylic acid vinyl ester and crotonic acid.

15. A fluorine-containing copolymer according to claim 14, wherein the carboxylic acid vinyl ester is vinyl pivalate or vinyl acetate.

16. A fluorine-containing copolymer according to claim 14, wherein the carboxylic acid vinyl ester is vinyl pivalate.

17. A fluorine-containing copolymer according to claim 14, wherein proportions of the carboxylic acid vinyl ester and crotonic acid constituting the copolymer are 10–50 mol % and 1–5 mol %, respectively.

* * * * *